Patented July 14, 1942

2,289,413

UNITED STATES PATENT OFFICE 2,289,413

MANUFACTURE OF DYES

George Holland Ellis, Henry Charles Olpin, and John Wright, Spondon, near Derby, England, assignors to Celanese Corporation of America, a corporation of Delaware No Drawing. Application December 20, 1939, Serial No. 310,176. In Great Britain December 31, 1938

20 Claims. (Cl. 8—48)

This invention relates to the production of new dyes and to the production of textile materials and cellulose ester and ether products coloured therewith.

According to the present invention valuable new azo dyes are prepared by coupling diazotised amino azo compounds with monoacidyl-m-phenylene diamines capable of coupling in para-position to the non-acidylated amino group. Coupling components particularly suitable for purposes of the invention are the mono-acidyl-m-phenyl diamines of the general formula

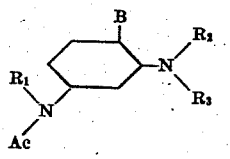

wherein B represents hydrogen, halogen, alkyl, or alkoxy (including substituted alkoxy, e. g. β-hydroxyethoxy), Ac represents an acidyl group derived from an aliphatic or aromatic carboxylic acid, particularly a fatty acid containing less than 5 carbon atoms or a benzene carboxylic acid, and $R_1$ represents hydrogen or alkyl (including substituted alkyl e. g. hydroxyethyl or other hydroxyalkyl), and $R_2$ and $R_3$ represent organic substituents for example, alkyl, aryl, aralkyl, or cycloalkyl groups (including substituted alkyl, aryl, aralkyl or cycloalkyl groups) or where $R_2$ represents an organic substituent and $R_3$ represents hydrogen. If desired, $R_2$ and $R_3$ may together constitute a chain of methylene groups forming, together with the associated nitrogen atom, a heterocyclic ring, for example the piperidine ring. Of especial value are the coupling components of this general formula in which $R_1$ represents hydrogen, $R_2$ and $R_3$ represent alkyl groups, for example, ethyl, methyl, hydroxyethyl or hydroxypropyl, and Ac represents an acidyl group derived from a fatty acid containing less than 5 carbon atoms, for example, the acetyl group or the propionyl group.

It will be appreciated that the dyes are characterised by containing at least two azo groups and having a residue of a mono-acidyl m-phenylene diamine as an end component.

The new dyes can be produced in substance or on a textile material, artificial straws, foils or the like. Particularly valuable results can be obtained by forming the new dyes on textile materials, straws, foils, or the like made from cellulose acetate or other cellulose ester or ether. By forming the dyes on these materials dark shades may be obtained, particularly navy blue to black shades, which have very good fastness properties. Moreover, many of these shades can readily be discharged, for example, by means of zinc formaldehyde sulphoxylate.

Diazo components suitable for the purposes of the invention are azo-benzenes, azo-α-naphthalenes and benzene-azo-α-naphthalenes containing one or two diazotisable amino groups in para-positions to azo groups. Substituents may be present in addition to the diazotisable amino groups and the azo groups, for examplpe, alkyl groups, acidylamino groups, (e. g. acidylamino groups of the type mentioned above in connection with the coupling component) alkoxy groups, e. g. methoxy or ethoxy groups, halogen atoms, or nitro groups, the latter two types of substituents more particularly in a nucleus which does not contain a diazotisable amino group. Sulphonic and carboxylic groups are preferably absent from the diazo components when producing dyes for colouring cellulose esters or ethers or when producing dyes in cellulose esters or ethers.

Amino-azo compounds, very useful as diazo components, are those obtainable by coupling with para coupling amines diazo compounds of aniline, toluidines, anisidines, phenetidines, α-naphthylamine, and their halogen, nitro, and halogen-nitro derivatives (e. g., o-, m-, and p-nitroaniline and 4-chlor-3-nitraniline). Of particular value for the purposes of the invention are diazo components of the general formula

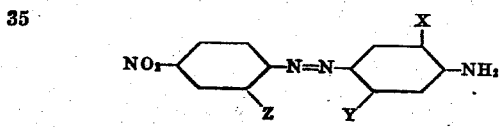

wherein X represents hydrogen, alkoxy, hydroxy-alkyloxy, alkyl or halogen, Y represents alkoxy, alkyl, halogen or acidylamino, and Z represents hydrogen, nitro or halogen. Such amino-azo compounds can be prepared by coupling diazotised p-nitraniline or the appropriate halogen derivative thereof, or 2:4-dinitraniline, with the appropriately substituted para coupling aniline, e. g. m-toluidine, cresidine, p-xylidine, 2:5-dimethoxy - aniline, 2:5 - diethoxy - aniline, mono-acetyl-m-phenylene diamine, 4-acetylamino-2-amino-toluene, 2-amino-4-acetylamino-anisole, 2 - amino-4-acetylamino-1-hydroxyethoxybenzene, mono-benzoyl-m-phenylene diamine or 1-amino-3-acetyl-methylamino-benzene.

As coupling components for the production of the new dyes on cellulose ester or ether or other materials especial mention may be made of the mono-acidyl-m-phenylene diamines of the formula given above, wherein B is hydrogen, and particularly those compounds wherein B and $R_1$ are hydrogen, $R_2$ and $R_3$ are alkyl or substituted alkyl groups, and Ac is an acidyl group derived from a fatty acid containing less than 5 carbon atoms, particularly acetic acid or from a benzene carboxylic acid. Examples of such compounds are 3-acetyl-amino-1-dimethylamino-benzene, 3-acetyl-amino-1-diethylamino-benzene, and 3-acetylamino-1-di(hydroxyethyl)amino-benzene, 3-acetylamino-1-(N-ethyl-N-hydroxy-ethyl)-amino-benzene, and the corresponding benzoyl derivatives.

Coupling components of the above general formula in which B is a substituent, e. g., alkoxy are more particularly of value for the production of dyes in substance. Such coupling components are 3-acetylamino-6-methoxy-1-diethylamino-benzene and 3-acetylamino-6-methyl-1-diethylamino-benzene.

The following table gives some of the diazo components which have been found especially suitable for the production of the new dyes on cellulose ester or ether materials. It also gives the shades obtainable when the diazo compounds in question are diazotised on cellulose acetate materials and coupled with 3-acetylamino-1-diethylamino-benzene

| Diazo component | Shade |
| --- | --- |
| 4-nitro-4'-amino-2'5'-dimethoxy-azo-benzene | Bright navy blue to black. |
| 4-nitro-4'-amino-2'5'-diethoxy-azo-benzene | Navy blue. |
| 4-nitrobenzene-azo-α-naphthylamine | Do. |
| 4-nitro-2-chlorbenzene-azo-α-naphthylamine | Greenish navy blue. |
| 4-nitro-2-chlor-4'-amino-2'-methyl-5'-methoxy-azo-benzene. | Navy blue. |
| 4-nitro-4'-amino-2'-acetyl-amino-5'-methoxy-azo-benzene. | Greenish navy blue. |
| 4-nitro-2-chlor-2'5'-dimethoxy-azo-benzene | Do. |
| 4-nitro-4'-amino-azo-benzene | Violet. |
| 4-nitro-4'amino-2'-methyl-azo-benzene | Do. |

The colours of the new dyes are, as compared with those of analogous dyes which do not contain the acidylamino group in the coupling component, displaced towards the green end of the colour series extending from yellow to green through orange, red, violet and blue. Particularly greenish shades are obtained when there is used as diazo component a nitro-amino-azo dye of the above given general formula in which Y is an acidylamino group.

As regards the procedure to be followed in forming the dyes on cellulose ester or ether materials, it is preferred to incorporate the diazo component in the material and then to effect diazotisation and couple with the coupling component in a separate bath.

The diazo components can be applied to cellulose ester or ether materials in the form of aqueous dispersions. Bath methods may be employed, that is to say methods in which the materials are allowed to absorb the diazo component from an aqueous dispersion of the latter in which they are immersed. Again, mechanical impregnation methods may be used, the materials being impregnated with a quantity of liquid containing the requisite proportion of diazo component. To this end padding or printing methods may be utilised. The mechanically impregnated material may then be aged or steamed to cause the diazo component to enter the cellulose ester or ether material.

If a diazo component having substantive affinity for cellulose esters or ethers but substantially no substantive affinity for cellulose is applied to mixed materials containing both cellulose (e. g. cotton or regenerated cellulose) and a cellulose ester or ether, the latter alone takes up the diazo component, so that on diazotising and coupling with the monoacidyl m-phenylene diamine the cellulose component of the material remains uncoloured. By suitably colouring the cellulose component of such mixed material with dyestuffs resisting the cellulose ester or ether component of the materials solid shades or two colour effects can readily be obtained according to the components and dye selected. The dyestuff for the cellulose portion can be applied before or after the development of the azo dye on the cellulose ester or ether portion. If desired, however, it may be applied before development and either together with or separately from the diazo component applied to the cellulose ester or ether portion. If the dyestuff for the cellulose component is diazotisable it can be diazotised and developed with a suitable coupling component at any convenient stage of the operation. Further, if desired, the mono-acidyl-m-phenylene diamine employed in accordance with the present invention for the formation of an azo dye on the cellulose ester or ether component of the material may simultaneously be used to develop the diazotised dyestuff on the cellulose component of the mixed material. It will be appreciated that the mono-acidyl-m-phenylene diamines can be used to couple with diazotised amino-azo-compounds for the production of azo dyes on textile materials generally and whether cellulose ester or ether material is present or not. For example a textile material composed wholly of cotton or regenerated cellulose can be allowed to take up a diazotisable substantive azo dye and the latter diazotised on the material and developed with a mono-acidyl-m-phenylene diamine in manner similar to that described above in connection with the colouring of the cellulose component of a textile containing both cellulose and a cellulose ester or ether.

The dyeings produced on cellulose ester or ether materials in accordance with the invention may be subsequently topped with other dyes and particularly with dyestuffs having direct affinity for the cellulose ester or ether. For example, a navy blue shade produced according to the invention may be topped with an orange dye or with both a red dye and a yellow dye in order to produce a very dark navy or black shade. Such topping colours may, if desired, be applied to the material before the diazotisation of the amino-azo compound and either together with or separately from the latter. It is, however, a merit of the process of forming the dyes on cellulose ester or ether materials that navy blue to black shades of commercially desirable hue can be obtained directly and without recourse to any topping process.

As mentioned above the new dyes can also be produced in substance. In this form they can be employed for colouring cellulose ester or ether materials by direct dyeing methods though, in general, this method of colouring such materials is less advantageous than the method of forming the dyes on the fibre as described above. When formed in substance the dyes are of particular value for colouring cellulose ester or ether solutions, especially lacquers and spinning solutions. By shaping and setting such 3. A dis-azo dye of which each aryl nucleus is selected from the group consisting of the benzene nucleus and the naphthalene nucleus, the said dye having as the end component a residue of a mono-acidyl-meta-phenylene-diamine capable of coupling in the para position to the non-acidylated amino group, and of which the non-acidylated amino group carries at least one alkyl group as a substituent.

4. A dis-azo dye of which each aryl nucleus is selected from the group consisting of the benzene nucleus and the naphthalene nucleus, the said dye having as the end component a residue of a mono-acidyl-meta-phenylene-diamine of the general formula

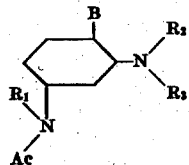

wherein B represents hydrogen, halogen, alkyl or alkoxy, Ac represents an acidyl group derived from a carboxylic acid, R₁ represents hydrogen or alkyl, and R₂ and R₃ represent alkyl.

5. An azo dye of the general formula

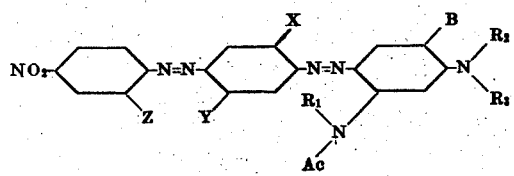

where X is selected from the class consisting of hydrogen, alkoxy, hydroxyalkoxy, alkyl and halogen, Y is selected from the class consisting of hydrogen and alkyl, Z is selected from the class consisting of hydrogen, nitro and halogen, Ac is an acidyl residue of a carboxylic acid, R₁ and R₂ are alkyl groups, and B is selected from the class consisting of hydrogen, halogen, alkyl and alkoxy.

6. An azo dye according to claim 5, wherein R₁ is hydrogen, Ac is acetyl and B is hydrogen.

7. An azo dye of the formula

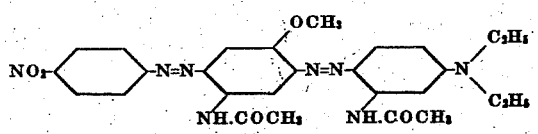

8. An azo dye of the formula

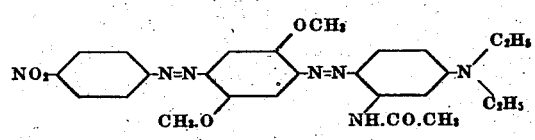

9. An azo dye of the formula

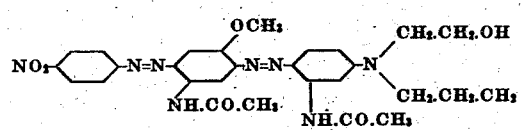

10. Process for the coloration of textile materials which comprises forming an azo dye thereon by coupling a diazotized amino azo compound, said amino azo compound being one in which each aryl nucleus is selected from the group consisting of the benzene nucleus and the naphthalene nucleus, with a mono-acidyl-meta-phenylene-diamine of the general formula

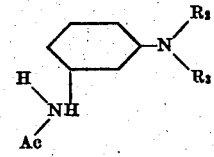

where Ac represents an acidyl group derived from a fatty acid containing less than 5 carbon atoms and R₂ and R₃ represent alkyl groups.

11. Process for the coloration of cellulose acetate materials, which comprises incorporating therein an amino-mono-azo compound of which each aryl nucleus is selected from the group consisting of the benzene nucleus and the naphthalene nucleus and thereafter diazotizing and coupling with a mono-acidyl-m-phenylene-diamine of the general formula

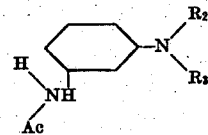

wherein Ac represents an acidyl group derived from a fatty acid containing less than 5 carbon atoms and R₂ and R₃ represent alkyl groups.

12. Process for the coloration of cellulose acetate materials which comprises incorporating therein an amino-azo compound obtainable by diazotizing a nitro-aniline and coupling with a para coupling primary amine of the benzene series, and thereafter diazotizing said amino-azo compound and coupling with a mono-acidyl-m-phenylene-diamine of the general formula

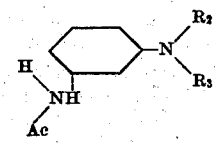

wherein Ac represents an acidyl group derived from a fatty acid containing less than 5 carbon atoms and R₂ and R₃ represent alkyl groups.

13. Process for the coloration of cellulose acetate materials which comprises incorporating therein an amino-azo compound of the general formula

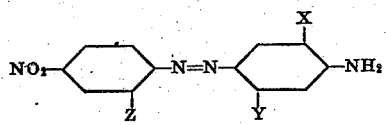

wherein X represents hydrogen, alkoxy, alkyl or halogen, Y represents alkoxy, alkyl, halogen or acidylamino, and Z represents hydrogen, nitro or halogen, and thereafter diazotizing said amino-azo compound and coupling it with a mono-acidyl-m-phenylene-diamine of the general formula

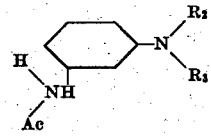

wherein Ac represents an acidyl group derived from a fatty acid containing less than 5 carbon atoms and R₂ and R₃ represent alkyl groups.

14. Process for the coloration of cellulose acetate materials which comprises incorporating solutions in the form of filaments, straws, films and the like valuable coloured products can be produced. For example, coloured cellulose acetate filaments can be produced by dry spinning such coloured solutions. The coloured products so obtained by spinning methods can be topped with suitable direct dyeing dyes or mixtures of dyes in order to produce a wide range of deep shades. For this purpose it is particularly advantageous to spin filaments containing a proportion of dye such that the product is of a blue shade. A single product of this kind can, by suitable choice of topping colour, be caused to yield a very large number of commercially desirable shades.

The invention is illustrated by the following examples.

Example 1

10 parts of finely milled 10% aqueous paste of 4-nitro-4'-amino-2':5'-dimethoxy-azo-benzene is dispersed in 3,000 parts of water with the aid of soap and Turkey red oil. 100 parts of cellulose acetate fabric is dyed in this bath at 78 to 80° C. for about 2 hours. The material is then removed from the bath, rinsed and diazotised for 30 minutes at ordinary temperature in a 30:1 bath prepared with 20 parts of concentrated hydrochloric acid and 5 parts of sodium nitrite. The diazotised material is then rinsed and entered into a cold 30:1 coupling bath containing 2 parts of 3-acetylamino-1-diethylamino-benzene dispersed with 10 parts of Turkey red oil. After working for a short time cold the temperature is raised to 60° C. which is maintained for half an hour. The material is then rinsed and soaped for half an hour at 60° C. in a solution containing 0.25 grams per litre of soap. A full navy blue shade of excellent fastness properties is thus obtained; it can readily be discharged with soluble zinc formaldehyde sulphoxylate. By doubling the quantity of 4-nitro-4'-amino-2':5'-dimethoxy-azo-benzene a black shade is obtained.

By substituting half the quantity of 4-nitro-4'-amino-2'-acetylamino-5'-methoxy-azo-benzene for the 4-nitro-2':5'-dimethoxy-azo benzene and 1 part of 3-acetylamino-1-diethylamino-benzene or 1 part of 3-acetylamino-1-di(β-hydroxyethyl)-amino-benzene for the 2 parts of 3-acetylamino-1-diethylamino-benzene specified above, a greenish navy blue shade is obtained.

Example 2

A fabric consisting of cellulose acetate artificial silk and viscose artificial silk in equal proportions by weight is dyed with 5% of its weight of a 10% paste of 4-nitro-4'-amino-2':5'-dimethoxy-azo-benzene and 2.5% of its weight of Diazo Indigo Blue BR from a 30:1 bath, the former being dispersed in the bath with soap and Turkey red oil. The material is then rinsed and both dyes diazotised in the manner described in Example 1. After rinsing, the diazotised material is introduced at 50° C. into a 30:1 bath containing, based on the weight of the goods, 3% of 3-acetylamino-1-diethylaminobenzene dispersed with 3 times its weight of Turkey red oil and 0.2% of soda ash. The material is treated in the bath for ¾ hour while the temperature is raised to 60° C. Finally the material is rinsed and soaped in a 1 gram per litre soap solution for ½ hour at 60° C. A solid navy blue shade is obtained.

By increasing the proportion of 4-nitro-4'-amino-2':5'-dimethoxy-azo-benzene to 10% and substituting 3.5% of Oxydiaminogen OT for the 2.5% of Diazo Indigo Blue BR a solid black shade results.

By using other diazotisable dyes for colouring the viscose a wide range of two colour effects can be obtained. Examples of such dyes are Diazo Brilliant Orange 5G, Diazo Fast Red 7BL, Diazo Brilliant Blue BBLA, Diazo Fast Green GL, Diazo Fast Green GRL and Chlorazol Black BH.

Example 3

A fabric consisting of cellulose acetate artificial silk and viscose artificial silk in equal proportions by weight is dyed with 5% of its weight of a 10% paste of 4-nitro-4'-amino-2':5'-dimethoxy-azo-benzene. Diazotisation and coupling, using 2% of its weight of 3-acetylamino-1-diethylamino benzene, followed by soaping are then carried out in the manner described in Example 2. Prior to the last 10 minutes of the soaping 0.2 gram of sodium hydrosulphite are added per litre of the soaping bath to remove any traces of colour formed on the viscose.

The cellulose acetate part of the material is thus coloured navy blue leaving the viscose uncoloured.

Example 4

A suspension of 30.2 parts of 4-nitro-4'-amino-2':5'-dimethoxy-azo-benzene in 180 parts of glacial acetic acid is slowly added to a solution of nitrosyl sulphuric acid made from 7.2 parts of sodium nitrite and 140 parts of 96% sulphuric acid. The temperature is maintained at 10–15° C. during the addition and for 1½ hours thereafter. After adding 2 parts of sulphamic acid the solution is run slowly into a well-stirred solution of 20.7 parts of 3-acetylamino-1-diethyl-aminobenzene in 2500 parts of 10% sodium acetate solution to which has been added 17 parts of concentrated hydrochloric acid. After stirring for a further ½ hour the product is filtered off, washed and dried.

1 part of the above colouring matter is milled with 25 parts of a 10% solution of cellulose acetate in acetone in which the colouring matter dissolved in part at least. Sufficient cellulose acetate and acetone are then added to form a solution containing 25% of cellulose acetate and .0625% of the colouring matter. This solution is spun into filaments by dry-spinning methods. The filaments are blue in colour and can be over-dyed with suitable dischargeable dyes having direct affinity for cellulose acetate to give a wide range of dischargeable brown, green, grey and navy blue shades.

Having described our invention, what we desire to secure by Letters Patent is:

1. Process for the production of an azo dye which comprises coupling a diazotized amino azo compound, of which each aryl nucleus is selected from the group consisting of the benzene nucleus and the naphthalene nucleus, with a mono-acidyl-meta-phenylene-diamine capable of coupling in the para position to the non-acidylated amino group.

2. A dis-azo dye of which each aryl nucleus is selected from the group consisting of the benzene nucleus and the naphthalene nucleus, said dye having as the end component the residue of a mono-acidyl meta-phenylene-diamine capable of coupling in the para position to the non-acidylated amino group.

4-nitro-4'-amino-2':5'-dimethoxy-azo-benzene therein, and thereafter diazotizing and coupling with 3-acetylamino-1-diethylamino-benzene.

15. Process for the coloration of cellulose acetate materials which comprises incorporating 4-nitro-4'-amino-2'-acetylamino-5'-methoxy-azo-benzene therein, and thereafter diazotizing and coupling with 3-acetylamino-1-diethylamino-benzene.

16. Process for the coloration of cellulose acetate materials which comprises incorporating 4-nitro-4'-amino-2'-acetylamino-5'-methoxy-azo-benzene therein, and thereafter diazotizing and coupling with 3-acetylamino-1-di($\beta$-hydroxyethyl)-amino-benzene.

17. Textile materials coloured with a dye claimed in claim 3.

18. Cellulose acetate materials coloured with a dye claimed in claim 4.

19. Cellulose acetate materials coloured with a dye claimed in claim 5.

20. Cellulose acetate materials coloured with a dye claimed in claim 9.

GEORGE HOLLAND ELLIS.
HENRY CHARLES OLPIN.
JOHN WRIGHT.